(12) United States Patent
Johansson

(10) Patent No.: US 8,789,872 B2
(45) Date of Patent: Jul. 29, 2014

(54) BEAM IN A VEHICLE DOOR AND A METHOD OF RUSTPROOFING A VEHICLE DOOR

(75) Inventor: Joakim Johansson, Lulea (SE)

(73) Assignee: Gestamp Hardtech AB, Lulea (SE)

(*) Notice: Subject to any disclaimer, the term of this patent is extended or adjusted under 35 U.S.C. 154(b) by 0 days.

(21) Appl. No.: 13/261,397

(22) PCT Filed: Jan. 19, 2011

(86) PCT No.: PCT/SE2011/000004
§ 371 (c)(1),
(2), (4) Date: Oct. 16, 2012

(87) PCT Pub. No.: WO2011/099912
PCT Pub. Date: Aug. 18, 2011

(65) Prior Publication Data
US 2013/0033065 A1   Feb. 7, 2013

(30) Foreign Application Priority Data
Feb. 12, 2010   (SE) ........................................ 1000136

(51) Int. Cl.
*B60J 5/04* (2006.01)
(52) U.S. Cl.
CPC ..................................... *B60J 5/042* (2013.01)
USPC ...................................... 296/146.6; 427/435

(58) Field of Classification Search
USPC ...................... 296/187.12, 146.6, 188, 146.4; 427/435; 148/518
See application file for complete search history.

(56) References Cited

U.S. PATENT DOCUMENTS

| 5,232,261 A | * | 8/1993 | Kuroda et al. ............. 296/146.4 |
| 5,600,931 A | | 2/1997 | Jonsson |
| 6,395,162 B1 | * | 5/2002 | Watanabe et al. ................ 205/50 |
| 2006/0130940 A1 | * | 6/2006 | Kollaritsch et al. ........... 148/518 |

FOREIGN PATENT DOCUMENTS

| EP | 1803596 A2 | 7/2007 |
| FR | 2937288 A1 | 4/2010 |

* cited by examiner

Primary Examiner — Joseph D Pape
Assistant Examiner — Dana Ivey
(74) Attorney, Agent, or Firm — Mark P. Stone

(57) ABSTRACT

A safety beam (11) in a vehicle door comprises an attachment end with a plurality of grooves (22, 23, 24) forming through channels to the underlying structure. The grooves have a height of 1-6 mm and an inner width of 3-7 mm and flat surfaces (18-21) between the grooves and to the outside of the outermost grooves have a width of 15-30 mm. Each of the flat surfaces comprises only one spot weld (26-29) to the underlying structure (12). The safety beam is immersed in a bath of anti-corrosive paint after assembly and is thus protected against crevice corrosion.

8 Claims, 1 Drawing Sheet

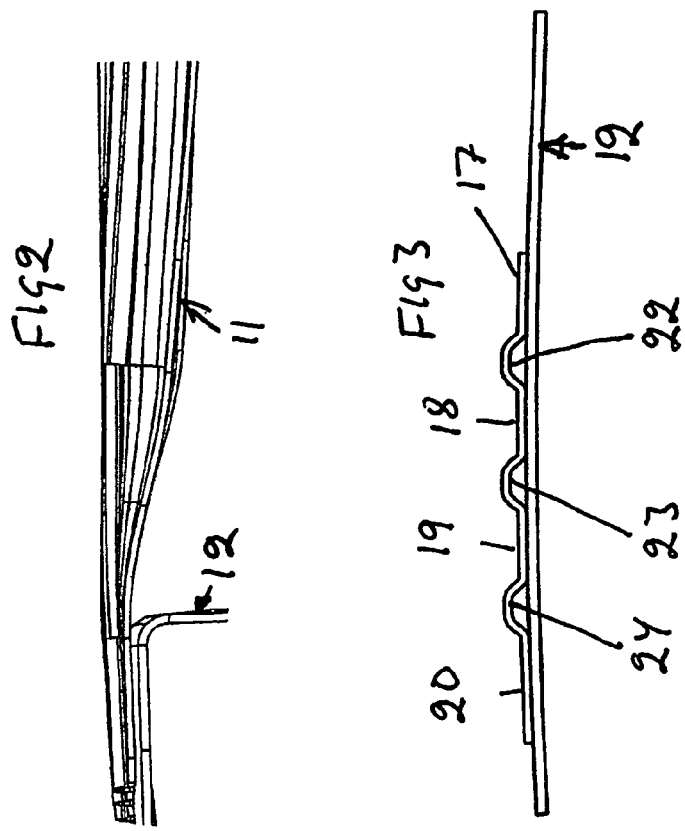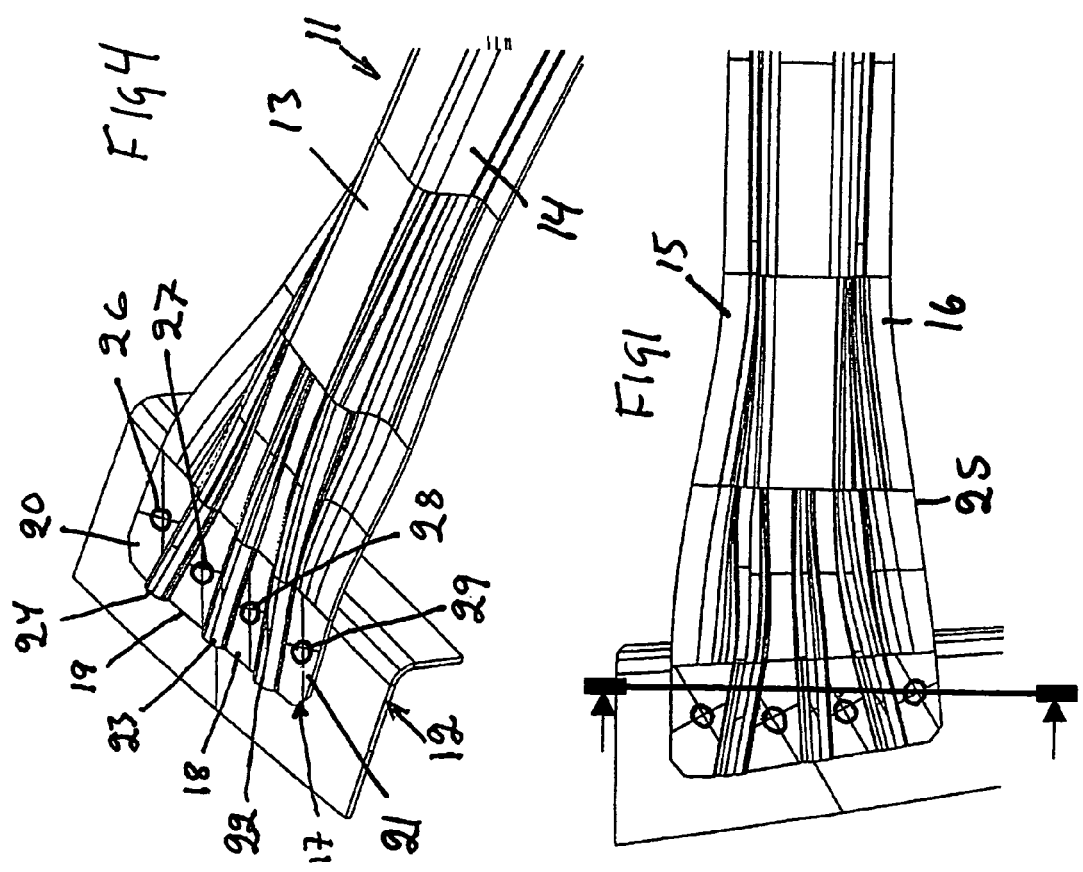

BEAM IN A VEHICLE DOOR AND A METHOD OF RUSTPROOFING A VEHICLE DOOR

FIELD OF THE INVENTION

The invention relates to a beam in a vehicle door, wherein the beam extends between the front and rear vertical structures of the door and is welded thereto, the door beam having a section comprising at least one flattened attachment end and comprising grooves extending from this attachment end and flat surfaces between the grooves with spot welds. The invention also relates to a method of rustproofing a door beam.

BACKGROUND OF THE INVENTION

Vehicle doors are increasingly being provided with a safety beam for side-impact protection. U.S. Pat. No. 5,232,261 shows embodiments of a beam of this kind spot-welded to the underlying structure. The grooves are provided to allow for thinning of the sheet metal so that its thickness is suitable for spot welding. U.S. Pat. No. 5,600,931 and EP 1 803 596 show other embodiments of door beams spot-welded to the underlying structure.

AIM OF THE INVENTION

The aim of the invention is to reduce the risk of crevice corrosion.

BRIEF DESCRIPTION OF THE INVENTION

The abovementioned aim is achieved in that the attachment end comprises at least three grooves forming through channels to the underlying vertical structure, that each flat surface between the grooves comprises only one spot weld to the underlying vertical structure and has a width of 10-35 mm at the spot weld and that the attachment of the door beam is rustproofed by immersion in a bath of anti-corrosive paint after the attachment operation. The invention is defined by the claims.

BRIEF DESCRIPTION OF THE DRAWINGS ILLUSTRATING A PREFERRED EMBODIMENT OF THE INVENTION

FIG. 1 is a horizontal view of the end of a beam attached to a vertical door structure.
FIG. 2 is a view in the direction of the arrow 2 in FIG. 1.
FIG. 3 is a section along the line 3-3 in FIG. 1.
FIG. 4 is a perspective view of the attached beam illustrated in FIGS. 1-3.

DESCRIPTION OF ILLUSTRATED EMBODIMENT

The figures show one end of a safety beam 11 the end of which is spot-welded to a vertical part 12 of an underlying load-bearing structure of a vehicle door. In a conventional vehicle door, the beam is welded to the end wall of the load-bearing inner panel of the door. As this constitutes prior art, the entire door is not shown and reference should be made, e.g. to EP 1 803 596.

The beam 11 has a top-hat section, i.e. it comprises a central flange 13, two webs (sides) 14 and two side flanges 15, 16. The height of the top-hat section decreases and, in a transition zone 25, the beam is flattened into an attachment plate 17 comprising four flat surfaces 18, 19, 20, 21 bearing against the end wall 12 of the inner panel. Three grooves 22, 23, 24 extend from the end of the transition zone 25 to the end of the attachment plate 17, i.e. they extend from the end of the beam past the point at which the beam bears against the vertical part of the load-bearing structure, thereby forming through channels. Each of the bearing surfaces 18-21 comprises one single spot weld 26, 27, 28, 29.

When the semi-finished door with its beam 11 is immersed in a bath of anti-corrosive paint, the grooves are filled with paint which then flows out as the grooves are open in both directions. The anti-corrosive paint effectively inhibits crevice corrosion when each bearing surface comprises only one weld spot and the flat surfaces (17-20) between the grooves have a width of 10-35 mm. The flat surfaces to the outside of the outermost grooves should have a width of 10-35 mm at the grooves. The grooves may advantageously have an inner width of less than 15 mm and a height of 1-6 mm.

The invention claimed is:

1. Beam in a vehicle door, wherein the beam extends between the front and rear vertical structures of the door and is welded thereto, the door beam having a section comprising at least one flattened attachment end and comprising grooves extending from the at least one flattened attachment end and flat surfaces (18, 19) between the grooves (22, 23, 24) with spot welds to attach the at least one flattened attachment end to a structure on the vehicle door,
wherein
the at least one flattened attachment end comprises at least three said grooves (22, 23, 24) defining through channels to the structure (12) on the vehicle door, each said flat surface (18, 19) between the at least three grooves comprises only one spot weld (27, 28) and each said flat surface has a width of 10-35 mm at the spot weld and that the at least one flattened attachment end of the door beam and the structure on the vehicle door is rustproofed by immersion of the door beam and the vehicle door in a bath of anti-corrosive paint after the door beam is attached to the structure on the vehicle door to reduce the risk of crevice corrosion.

2. Door beam according to claim 1, wherein flat surfaces (20, 21) to the outside of the outermost of said at least three grooves each comprise only one spot weld (26, 29) and each of said flat surfaces to the outside of said outermost of said at least three grooves has a width of 10-35 mm at the weld spot.

3. Door beam according to claim 1, wherein the at least three grooves (22, 23, 24) each have a height of 1-6 mm and an inner width of less than 15 mm.

4. Door beam according to claim 1, wherein the door beam has a top surface, the height of said top surface decreasing in a direction towards the at least one flattened attachment end.

5. Method of rustproofing a beam in a vehicle door for reducing the risk of crevice corrosion, said method comprising the steps of providing a door beam comprising at least one attachment end with at least three grooves (22, 23, 24) defining through channels to a structure on the vehicle door and flat surfaces (18, 19) between the at least three grooves, attaching the beam to the vehicle door by spot welding each of the flat surfaces with only one spot weld (26-29) to the structure (12) on the vehicle door and providing each said flat surface with a width of 10-35 mm at the spot weld, and rustproofing the beam by immersing the vehicle door and the beam in a bath of anti-corrosive paint after the vehicle door is attached to the door beam.

6. Door beam according to claim 2, wherein the door beam has a top surface, the height of said top surface decreasing in a direction towards the flattened attachment end.

7. Door beam according to claim 3, wherein the door beam has a top surface, the height of said top surface decreasing in a direction towards the flattened attachment end.

8. The method according to claim 5, including the step of providing said door beam with a flattened portion at said at least one attachment end.

* * * * *